United States Patent
Jiang

(10) Patent No.: US 11,800,435 B2
(45) Date of Patent: *Oct. 24, 2023

(54) SYSTEM MESSAGE TRANSMISSION METHOD AND DEVICE, AND SYSTEM MESSAGE RECEPTION METHOD AND DEVICE

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,083

(22) Filed: Oct. 22, 2021

(65) Prior Publication Data
US 2022/0046519 A1 Feb. 10, 2022

Related U.S. Application Data

(63) Continuation of application No. 16/670,200, filed on Oct. 31, 2019, now Pat. No. 11,272,431, which is a
(Continued)

(51) Int. Cl.
*H04W 72/04* (2023.01)
*H04W 48/10* (2009.01)
(Continued)

(52) U.S. Cl.
CPC ......... *H04W 48/10* (2013.01); *H04W 48/16* (2013.01); *H04W 72/0446* (2013.01); *H04W 72/12* (2013.01); *H04W 72/23* (2023.01)

(58) Field of Classification Search
CPC .... G06Q 10/0631; G06Q 10/00; G06Q 10/06; G08B 13/19608; G08B 13/00;
(Continued)

(56) References Cited

U.S. PATENT DOCUMENTS 10,834,752 B2* 11/2020 Kim .................... H04W 74/002
2009/0221293 A1* 9/2009 Petrovic ................ H04W 48/10
455/450
(Continued)

FOREIGN PATENT DOCUMENTS

CN 101562785 A 10/2009
CN 101562859 A 10/2009
(Continued)

OTHER PUBLICATIONS

First Office Action of Russian Application No. 2019137901/07 dated Jul. 16, 2020.
(Continued)

*Primary Examiner* — Nathan S Taylor
(74) *Attorney, Agent, or Firm* — Finnegan, Henderson, Farabow, Garrett & Dunner, L.L.P.

(57) ABSTRACT

A system message transmission method includes: broadcasting a minimum system message, wherein the minimum system information includes first indication information, and the first indication information is configured to indicate a modification period of at least one of second indication information or third indication information. The second indication information is configured to indicate whether target other system information transmitted in an on-demand manner among other system information is in a being transmitted state, and the third indication information is configured to indicate a transmission manner of the target other system information.

14 Claims, 9 Drawing Sheets

Related U.S. Application Data continuation of application No. PCT/CN2017/090087, filed on Jun. 26, 2017.

(51) Int. Cl.
| | |
|---|---|
| *H04W 48/16* | (2009.01) |
| *H04W 72/0446* | (2023.01) |
| *H04W 72/12* | (2023.01) |
| *H04W 72/23* | (2023.01) |

(58) Field of Classification Search
CPC ... G08B 13/196; H04L 63/102; H04L 63/105; H04L 67/22; H04L 29/06; H04L 29/08; H04W 4/023; H04W 4/02
See application file for complete search history.

(56) References Cited

U.S. PATENT DOCUMENTS

| | | | | |
|---|---|---|---|---|
| 2015/0181575 A1* | 6/2015 | Ng | ............ | H04W 72/23 |
| | | | | 370/329 |
| 2015/0208437 A1 | 7/2015 | Wang et al. | | |
| 2017/0251500 A1* | 8/2017 | Agiwal | ............ | H04W 74/0833 |
| 2017/0311290 A1* | 10/2017 | Adjakple | ............ | H04W 76/18 |
| 2017/0332372 A1* | 11/2017 | Lee | ............ | H04W 72/542 |
| 2018/0132168 A1* | 5/2018 | Ingale | ............ | H04W 72/042 |
| 2018/0199267 A1* | 7/2018 | Lin | ............ | H04W 48/10 |
| 2018/0324679 A1* | 11/2018 | Basu Mallick | ............ | H04W 4/06 |
| 2019/0069220 A1* | 2/2019 | Kim | ............ | H04L 27/2602 |
| 2019/0150071 A1* | 5/2019 | Lee | ............ | H04W 4/06 |
| | | | | 370/328 |
| 2019/0166622 A1* | 5/2019 | Kim | ............ | H04W 74/006 |
| 2019/0174554 A1* | 6/2019 | Deenoo | ............ | H04L 5/0048 |
| 2019/0268831 A1* | 8/2019 | Lee | ............ | H04W 88/023 |
| 2019/0387456 A1* | 12/2019 | Ishii | ............ | H04W 48/16 |
| 2019/0387461 A1* | 12/2019 | Ishii | ............ | H04W 72/0446 |
| 2020/0029365 A1* | 1/2020 | Kim | ............ | H04W 48/14 |
| 2020/0068477 A1* | 2/2020 | Awada | ............ | H04W 48/12 |
| 2020/0068479 A1* | 2/2020 | Jiang | ............ | H04W 72/12 |
| 2020/0084694 A1* | 3/2020 | Kim | ............ | H04W 48/14 |
| 2020/0288451 A1* | 9/2020 | Lee | ............ | H04W 72/54 |
| 2020/0404617 A1* | 12/2020 | Murray | ............ | H04B 7/0695 |
| 2020/0413439 A1* | 12/2020 | Kim | ............ | H04W 74/006 |
| 2021/0153105 A1* | 5/2021 | Tao | ............ | H04W 48/16 |

FOREIGN PATENT DOCUMENTS

| | | |
|---|---|---|
| CN | 105830515 A | 8/2016 |
| JP | 2009-519636 A | 5/2009 |
| RU | 2474962 C2 | 2/2013 |
| RU | 2480958 C2 | 4/2013 |
| WO | WO 2017/022870 A1 | 2/2017 |
| WO | WO 2017/075786 A1 | 5/2017 |
| WO | WO 2017/084712 A1 | 5/2017 |

OTHER PUBLICATIONS

Extended European Search Report in European Application No. 17916015.5, dated Jun. 26, 2020.
International Search Report Issued in Application No. PCT/CN2017/090087, dated Mar. 6, 2018, 2 pages.
CATT, "Additional indicator in support of on-demand SI Request", 3GPP TSG-RAN WG2 Meeting #98, R2-1704237, Hangzhou, China, May 15-19, 2017, 4 pages.
Huawei, HiSilicon, "Further considerations on "Minimum SI"", 3GPP TSG-RAN2 Meeting #96, R2-167579, Reno, Nevada, Nov. 14-18, 2016, 3 pages.
CMCC, "Further considerations on other SI", 3GPP TSG-RAN WG2 Meeting #96, R2-168750, Reno, Nevada, Nov. 14-18, 2016, 6 pages.
Vivo, "On demand SI General Procedure", 3GPP TSG-RAN WG2 Ad Hoc, R2-1706973, Qingdao, China, Jun. 27-29, 2017, 6 pages.
Huawei, HiSilicon, "SI Update procedure", 3GPP TSG-RAN WG2 Meeting #98, R2-1705176, Hangzhou, China, May 15-19, 2017, 4 pages.
Huawei, HiSilicon, "SI update procedure", 3GPP TSG-RAN WG2 NR Adhoc#2 Meeting, R2-1706766, Qingdao, China, Jun. 27-29, 2017, 3 pages.
First Office Action from the Intellectual Property Office India in counterpart Indian Application No. 201927043880 dated Feb. 8, 2021.
3rd Generation Partnership Project; Technical Specification Group Radio Access Network; Evolved Universal Terrestrial Radio Access (E-UTRA); Medium Access Control (MAC) protocol specification (Release 15), 3GPP TS 36.321 V15.6.0, (Jun. 2019), 133 pages.
3rd Generation Partnership Project; Technical Specification Group Radio Access Network; Evolved Universal Terrestrial Radio Access (E-UTRA); Radio Resource Control (RRC) Protocol specification (Release 15), 3GPP TS 36.331 V15.6.0, (Jun. 2019), 956 pages, Jun. 2019.

* cited by examiner

SYSTEM MESSAGE TRANSMISSION METHOD AND DEVICE, AND SYSTEM MESSAGE RECEPTION METHOD AND DEVICE

CROSS-REFERENCE TO RELATED APPLICATION

The present application is a continuation application of U.S. application Ser. No. 16/670,200, filed on Oct. 31, 2019, which is a continuation application of International Application No. PCT/CN2017/090087, filed on Jun. 26, 2017, the entire contents of both of which are incorporated herein by reference.

TECHNICAL FIELD

The present disclosure generally relates to communication technologies, and more particularly, to a system information transmission method, a system information transmission device, a system information receiving method, a system information receiving device, an electronic device, and a computer-readable storage medium.

BACKGROUND

The 5G system information transmitted from a base station to user equipment includes minimum system information and other system information. The minimum system information is transmitted to the user equipment in a broadcast manner; for the other system information, a part of the system information is transmitted to the user equipment in an on-demand manner, that is, such system information is transmitted to the user equipment upon receipt of the user's request, and another part of the system information is transmitted to the user equipment in a broadcast manner.

For other system information transmitted in a certain transmission manner, the time window corresponding to the transmission of the other system information is generally fixed, but whether the other system information is in the being transmitted state will change with the setting of the base station.

Thus, the user equipment is required to frequently send query information to the base station to determine in which time period the other system information is in the being transmitted state, and then receives the other system information in a corresponding receiving manner in the corresponding time window. Frequently sending the query information from the user equipment to the base station wastes the power of the user equipment on the one hand, and on the other hand, because the base station needs a certain time period to send feedback according to the query information. It is inconvenient for the user equipment to timely determine whether other system information is in a being transmitted state and timely receive such system information.

SUMMARY

Embodiments of the present disclosure provide a system information transmission method, a system information transmission device, a system information receiving method, a system information receiving device, an electronic device, and a computer-readable storage medium, so as to address deficiencies in related arts.

According to a first aspect of embodiments of the present disclosure, there is provided a system information transmission method, including: broadcasting minimum system information, wherein the minimum system information includes first indication information, and the first indication information is configured to indicate a modification period of second indication information and/or third indication information; wherein the second indication information is configured to indicate whether target other system information transmitted in an on-demand manner among other system information is in a being transmitted state, and the third indication information is configured to indicate a transmission manner of the target other system information.

According to a second aspect of embodiments of the present disclosure, there is provided a system information receiving method, including: receiving minimum system information transmitted from a base station, wherein the minimum system information includes first indication information, and the first indication information is configured to indicate a modification period of second indication information and/or third indication information; wherein the second indication information is configured to indicate whether target other system information transmitted in an on-demand manner among other system information is in a being transmitted state, and the third indication information is configured to indicate a transmission manner of the target other system information; and if it is determined according to the modification period that the target other system information is in the being transmitted state, receiving the target other system information in a time window corresponding to transmission of the target other system information.

According to a third aspect of embodiments of the present disclosure, there is provided an electronic device, including: a processor; and a memory storing instructions executable by the processor; wherein the processor is configured to: broadcast minimum system information, wherein the minimum system information includes first indication information, and the first indication information is configured to indicate a modification period of second indication information and/or third indication information; wherein the second indication information is configured to indicate whether target other system information transmitted in an on-demand manner among other system information is in a being transmitted state, and the third indication information is configured to indicate a transmission manner of the target other system information.

According to a fourth aspect of embodiments of the present disclosure, there is provided an electronic device, including: a processor; and a memory storing instructions executable by the processor; wherein the processor is configured to: receive minimum system information transmitted from a base station, wherein the minimum system information includes first indication information, and the first indication information is configured to indicate a modification period of second indication information and/or third indication information; wherein the second indication information is configured to indicate whether target other system information transmitted in an on-demand manner among other system information is in a being transmitted state, and the third indication information is configured to indicate a transmission manner of the target other system information; and if it is determined according to the modification period that the target other system information is in the being transmitted state, receive the target other system information in a time window corresponding to transmission of the target other system information.

According to a fifth aspect of embodiments of the present disclosure, there is provided a computer-readable storage medium having stored therein computer programs that, when executed by a processor, cause the processor to: broadcast minimum system information, wherein the minimum system information includes first indication information, and the first indication information is configured to indicate a modification period of second indication information and/or third indication information; wherein the second indication information is configured to indicate whether target other system information transmitted in an on-demand manner among other system information is in a being transmitted state, and the third indication information is configured to indicate a transmission manner of the target other system information.

According to a sixth aspect of embodiments of the present disclosure, there is provided a computer-readable storage medium having stored therein computer programs that, when executed by a processor, cause the processor to: receive minimum system information transmitted from a base station, wherein the minimum system information includes first indication information, and the first indication information is configured to indicate a modification period of second indication information and/or third indication information; wherein the second indication information is configured to indicate whether target other system information transmitted in an on-demand manner among other system information is in a being transmitted state, and the third indication information is configured to indicate a transmission manner of the target other system information; and if it is determined according to the modification period that the target other system information is in the being transmitted state, receive the target other system information in a time window corresponding to transmission of the target other system information.

The technical solutions according to embodiments of the present disclosure have the following advantageous effects:

According to the foregoing embodiments, the first indication information for indicating the modification period of the second indication information and the third indication information is set in the minimum system information. Because the minimum system message is always sent in a broadcast manner, it may be guaranteed that the user equipment can receive the minimum system information. Further, the modification period of the second indication information and the third indication information can be determined according to the first indication information in the minimum system message, so that the period in which the target other system information is in a being transmitted state can be determined, and/or the transmission manner of the target other system information in the period can be determined, and accordingly the user equipment can receive the target other system information in a corresponding receiving manner.

On the one hand, the user equipment is not required to send the query information to the base station, which saves the power of the user equipment. On the other hand, the user equipment can determine the period in which the target other system information is in the being transmitted state and/or the transmission manner of the target other system information in the period according to the first indication information, and thus the user equipment can timely receive the target other system information in a corresponding time window in a corresponding receiving manner.

It is to be understood that both the foregoing general description and the following detailed description are exemplary and explanatory only and are not restrictive of the invention, as claimed.

BRIEF DESCRIPTION OF THE DRAWINGS

The drawings used in the description of the embodiments will be briefly described below. The drawings in the following description are only some examples of the present disclosure, and other embodiments may be obtained by those skilled in the art without any inventive labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
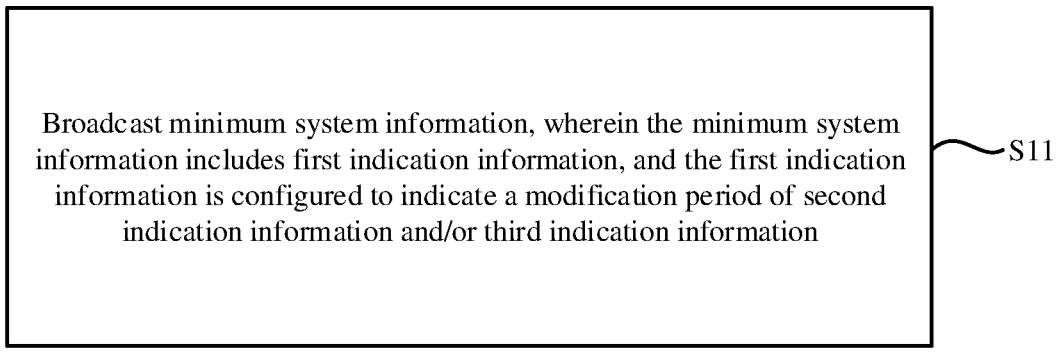
FIG. 1 is a flow chart of a system information transmission method according to an exemplary embodiment.

FIG. 1 is a flow chart of a system information transmission method according to an exemplary embodiment. The method can be used in a base station, such as a base station that transmits 5G signals. As shown in FIG. 1, the system information transmission method includes the following steps.

In step S11, minimum system information is broadcasted. The minimum system information includes first indication information, and the first indication information is configured to indicate a modification period of second indication information and/or third indication information.

The second indication information is configured to indicate whether target other system information transmitted in an on-demand manner among other system information is in a being transmitted state, and the third indication information is configured to indicate a transmission manner of the target other system information.

In an embodiment, taking a base station transmitting 5G signals as an example, the manner in which the base station transmitting 5G signals transmits system information is different from the manner in which a base station transmitting 4G signals transmits the system information. The manner for transmitting the system information by the base station transmitting 4G signals is only broadcasting, which brings about a problem that the base station consumes a large amount of power and the utilization rate of the spectrum is low.

The base station transmitting the 5G signals can divide the system information into minimum system information and other system information. The minimum system information includes at least information about cell selection and access, scheduling information about other system information, and the like, and thus the minimum system information is transmitted only in the broadcast manner. A part of the other system information is transmitted to the user equipment in an on-demand manner, that is, such system information is transmitted to the user equipment upon receipt of the user's request, and another part of the system information is transmitted to the user equipment in the broadcast manner.

In an embodiment, the base station may transmit a request for acquiring other system information by using the first message in random access (i.e., MSG1 for short, the user equipment may send an access channel preamble to the base station by using the message), and may also transmit a request for acquiring other system information by using the third message in random access (i.e., MSG3 for short, the user equipment may send uplink messages to the base station by using the message, such as a connection establishment request or data).

In an embodiment, the time window corresponding to other system information transmitted by the base station in a certain manner is fixed, that is, the base station transmits the other system information in a corresponding transmission manner only in one or more fixed time windows. However, for some reasons, for example, the setting information of the base station is changed, whether other system information transmitted in a certain manner is in a being transmitted state is changed, that is, a change occurs in the second indication information; and the transmission manner may also be changed, that is, a change occurs in the third indication information.

For example, the transmission state of the target other system information may be changed from being transmitted to not being transmitted. After the change occurs, if the user equipment continues to receive the target other system information in the time window corresponding to the transmission of the other system information before the change occurs, the target other system information will not be received. For addressing the problem, the user equipment needs to send query information to the base station frequently to determine the changes of the second indication information and the third indication information, and then adopt corresponding receiving manners in a corresponding time window to receive the other system information.

For example, the second indication information indicates that the target other system information is in the being transmitted state at 12:00-12:10, 12:15-12:25, 12:30-12:40, and 12:45-12:55, and the first indication information may be used to indicate that the modification period of the second indication information is 15 minutes. Further, it is also possible to indicate that the target other system information is in the being transmitted state in the first 10 minutes in one period, and the other system information is in the not being transmitted state in the last 5 minutes in one period.

In the embodiments, the first indication information for indicating the modification period of the second indication information and the third indication information is set in the minimum system information. Because the minimum system message is always sent in a broadcast manner, it can be guaranteed that the user equipment can receive the minimum system information. Further, the modification period of the second indication information and the third indication information can be determined according to the first indication information in the minimum system message, so that the period in which the target other system information is in a being transmitted state can be determined, and/or the transmission manner of the target other system information in the period can be determined, and accordingly the user equipment can apply a corresponding receiving manner to receive the target other system information (for example, if the transmission manner of the target other system information in the period is an on-demand manner, the user equipment may send a request to the base station and receive the target other system information transmitted from the base station).

In the embodiment, on the one hand, the user equipment is not required to send the query information to the base station, which saves the power of the user equipment; and on the other hand, the user equipment can timely determine the period in which the target other system information is in a being transmitted state and/or the transmission manner of the target other system information in the period, so that the user equipment can timely receive the target other system information in a corresponding time window in a corresponding receiving manner.

According to an exemplary embodiment, the third indication information is configured to indicate whether the target other system information is in the being transmitted state and to indicate the transmission manner of the target other system information.

In an embodiment, the second indication information and the third indication information may share bit(s), such that the third indication information is used to indicate whether the target other system information is in a being transmitted state and also to indicate the transmission manner of the target other system information. For example, the second indication information and the third indication information share two bits or one bit, and thus the number of bits used by the second indication information and the third indication information in the minimum system information can be reduced, and accordingly the minimum other system information may carry more information.

For example, in the case of sharing two bits, for the target other system information, if the two bits are 00, it indicates that the transmission manner is broadcast and the target other system information is in the being transmitted state. If the two bits are 01, it indicates that the transmission manner is broadcast and the target other system information is in a not being transmitted state. If the two bits are 10, it indicates that the transmission manner is on-demand and the target other system information is in the being transmitted state. If the two bits are 11, it indicates that the transmission manner is on-demand and the target other system information is in a not being transmitted state.

For example, in the case of sharing one bit, for the target other system information, if the bit is 1, it indicates that the transmission manner is broadcast and the target other system information is in a being transmitted state. If the bit is 0, it indicates that the target other system information is not to be transmitted and the transmission manner is on-demand manner. In the case of sharing one bit, there is a state (that is, the transmission manner is broadcast and the target other system information is not to be transmitted) that may not be represented, and when the bit is 0, the content represented by the bit is also uncertain. For addressing the two problems, other bits in the minimum system information can be used, and how many bits are selected can be set depending on actual needs.

Figure 2:
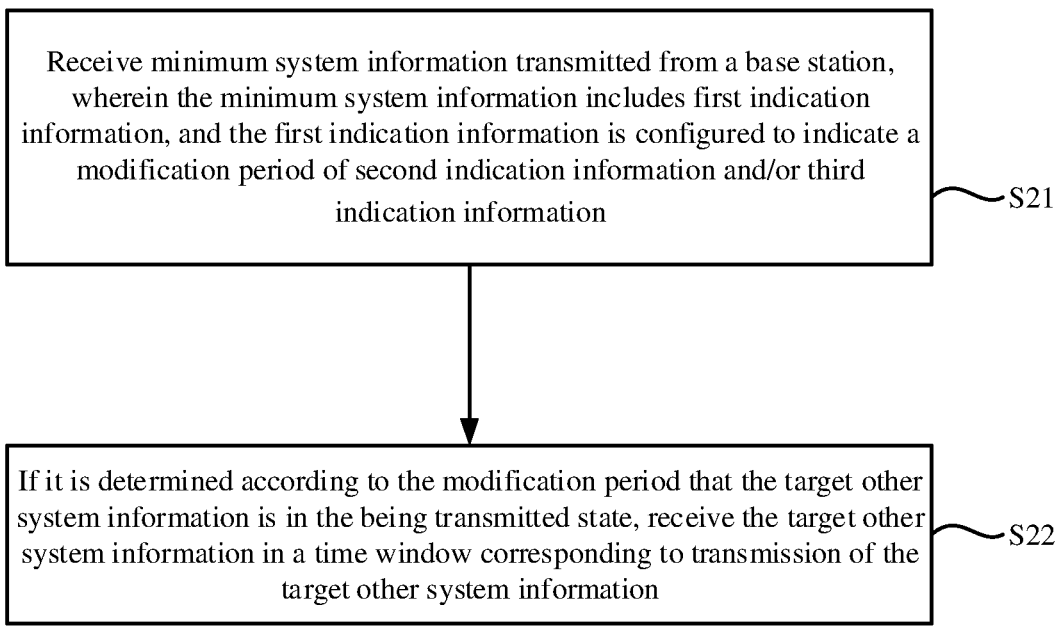
FIG. 2 is a flow chart of a system information receiving method according to an exemplary embodiment.

FIG. 2 is a flowchart of a system information receiving method according to an exemplary embodiment. The method can be used in user equipment, such as user equipment that receives 5G signals. As shown in FIG. 2, the system information receiving method includes the following steps.

In step S21, minimum system information transmitted from a base station is received. The minimum system information includes first indication information, and the first indication information is configured to indicate a modification period of second indication information and/or third indication information.

The second indication information is configured to indicate whether target other system information transmitted in an on-demand manner among other system information is in a being transmitted state, and the third indication information is configured to indicate a transmission manner of the target other system information.

In step S22, if it is determined according to the modification period that the target other system information is in the being transmitted state, the target other system information is received in a time window corresponding to transmission of the target other system information.

In an embodiment, the user equipment may receive the minimum system information and other system information sent by the base station in the embodiments described with reference to FIG. 1.

Because the first indication information for indicating the modification period of the second indication information and the third indication information is set in the minimum system information and the minimum system message is always sent in a broadcast manner, it can be guaranteed that the user equipment can receive the minimum system information. Further, the modification period of the second indication information and the third indication information can be determined according to the first indication information in the minimum system message, so that the period in which the target other system information is in a being transmitted state can be determined, and/or the transmission manner of the target other system information in the period can be determined, and accordingly the user equipment can receive the target other system information in a corresponding receiving manner.

On the one hand, the user equipment is not required to send the query information to the base station, which saves the power of the user equipment. On the other hand, the user equipment can determine the period in which the target other system information is in the being transmitted state and/or the transmission manner of the target other system information in the period according to the first indication information, and thus the user equipment can timely receive the target other system information in a corresponding time window in a corresponding receiving manner.

Figure 3:
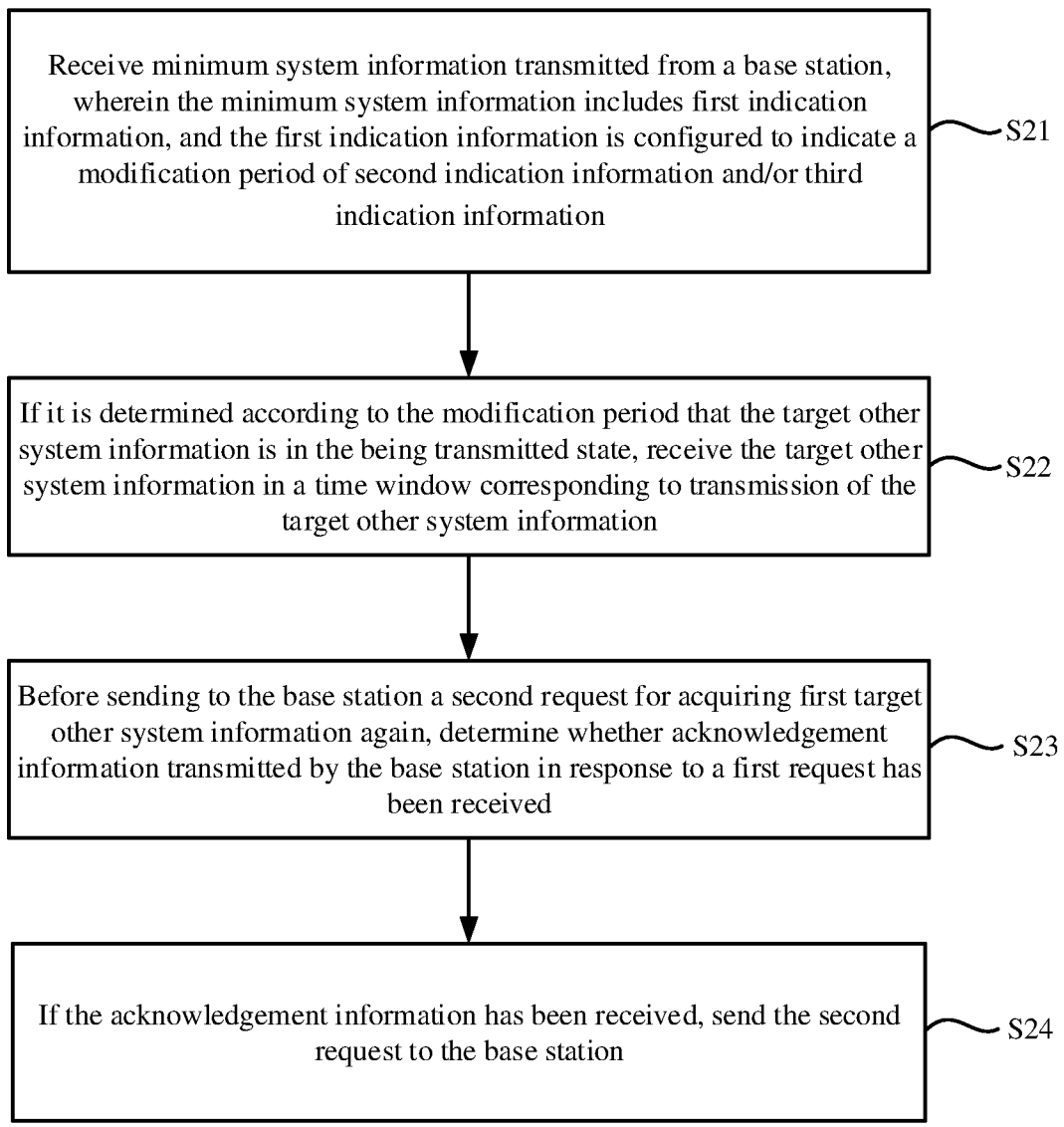
FIG. 3 is a flow chart of a system information receiving method according to an exemplary embodiment.

FIG. 3 is a flowchart of a system information receiving method according to an exemplary embodiment. As shown in FIG. 3, based on the embodiment shown in FIG. 2, the method further includes the following steps:

In step S23, before a second request for acquiring first target other system information again is sent to the base station, it is determined whether acknowledgement information transmitted by the base station in response to a first request has been received.

In step S24, if the acknowledgement information has been received, the second request is sent to the base station.

In an embodiment, the base station transmits a request for acquiring other system information to the base station mainly through MSG1 and/or MSG3. But, due to restrictions imposed on MSG1 and MSG3, if two requests are simultaneously transmitted through MSG1 and/or MSG3 (that is, when a second request is sent before receiving the acknowledgment information transmitted by the base station in response to the first request), the base station may not be able to feed back the correct acknowledgment information or even transmit the corresponding other system information. For example, if the user equipment sends two requests simultaneously through the MSG3, the base station may not be able to understand whether the bytes of the first request and the second request are separate two byte segments or a continuous byte segment, which may result in failure to feed back the correct acknowledgment information.

Therefore, by setting that the user equipment is allowed to send the second request after receiving the acknowledgement information for the first request, it may be guaranteed that the base station can correctly distinguish the two requests and feed back the correct acknowledgement information.

Figure 4:
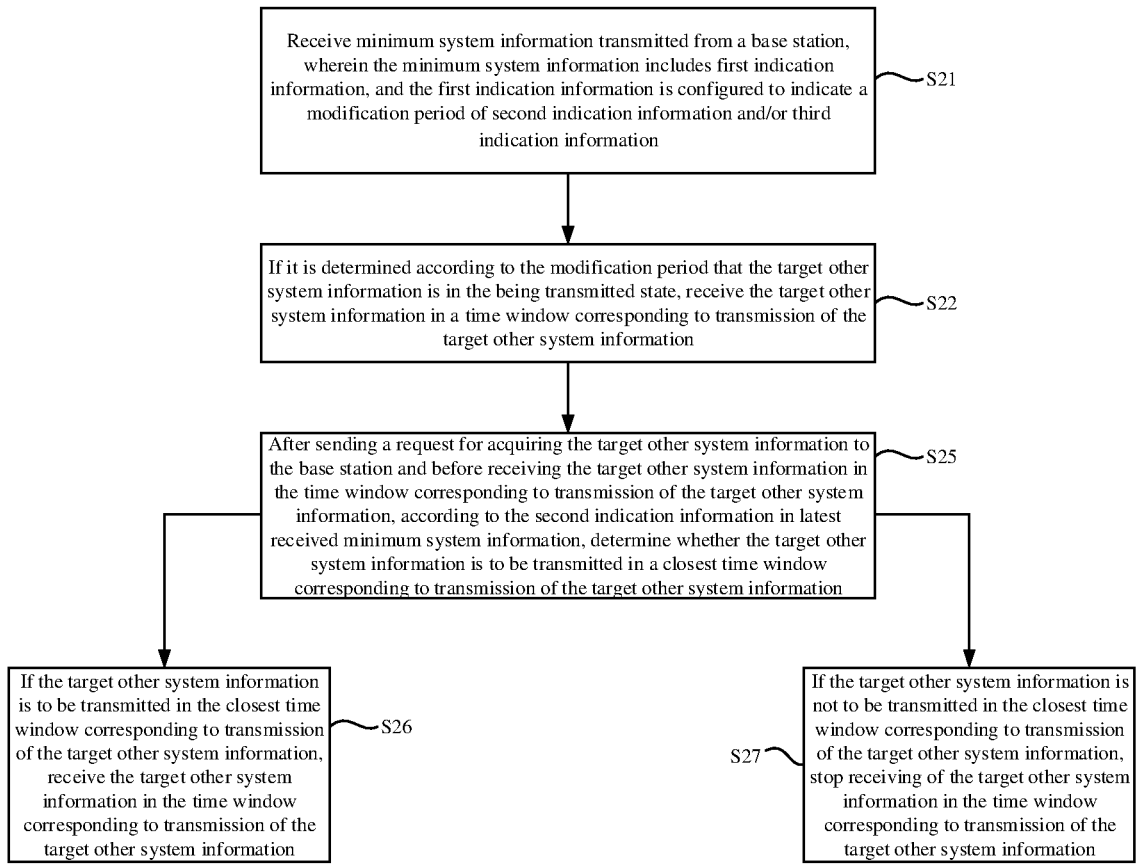
FIG. 4 is a flow chart of a system information receiving method according to an exemplary embodiment.

FIG. 4 is a flowchart of a system information receiving method according to an exemplary embodiment. As shown in FIG. 4, on the basis of the embodiment shown in FIG. 2, the foregoing system information receiving method further includes the following steps:

In step S25, after a request for acquiring the target other system information is sent to the base station and before the target other system information is received in the time window corresponding to transmission of the target other system information, according to the second indication information in latest received minimum system information, it is determined whether the target other system information is to be transmitted in a closest time window corresponding to transmission of the target other system information.

In step S26, if the target other system information is to be transmitted in the closest time window corresponding to transmission of the target other system information, the target other system information is received in the time window corresponding to transmission of the target other system information.

In step S27, if the target other system information is not to be transmitted in the closest time window corresponding to transmission of the target other system information, receiving of the target other system information in the time window corresponding to transmission of the target other system information is stopped.

In an embodiment, since there is a certain time interval between times when the user equipment receives the minimum system information, the second indication information in the latest received minimum system information may be different from the second indication information in previously received system information, for example, the transmission state of the target other system information may be changed.

Therefore, after the request for acquiring the target other system information is transmitted to the base station, and before the target other system information is received in the time window corresponding to transmission of the target other system information, the user equipment may determine whether the transmission state of the target other system information has been changed according to the second indication information in the latest system information. If a change occurs in the transmission state of the target other system information, the receiving policy can be changed. For example, if the target other system information changes from the not being transmitted state to the being transmitted state, the target other system information may be received in the corresponding time window to ensure that the target other system information can be received in time. For example, if the target other system information changes from the being transmitted state to the not being transmitted state, the user equipment can stop receiving the target other system information in the corresponding time window to reduce electricity consumption.

Figure 5:
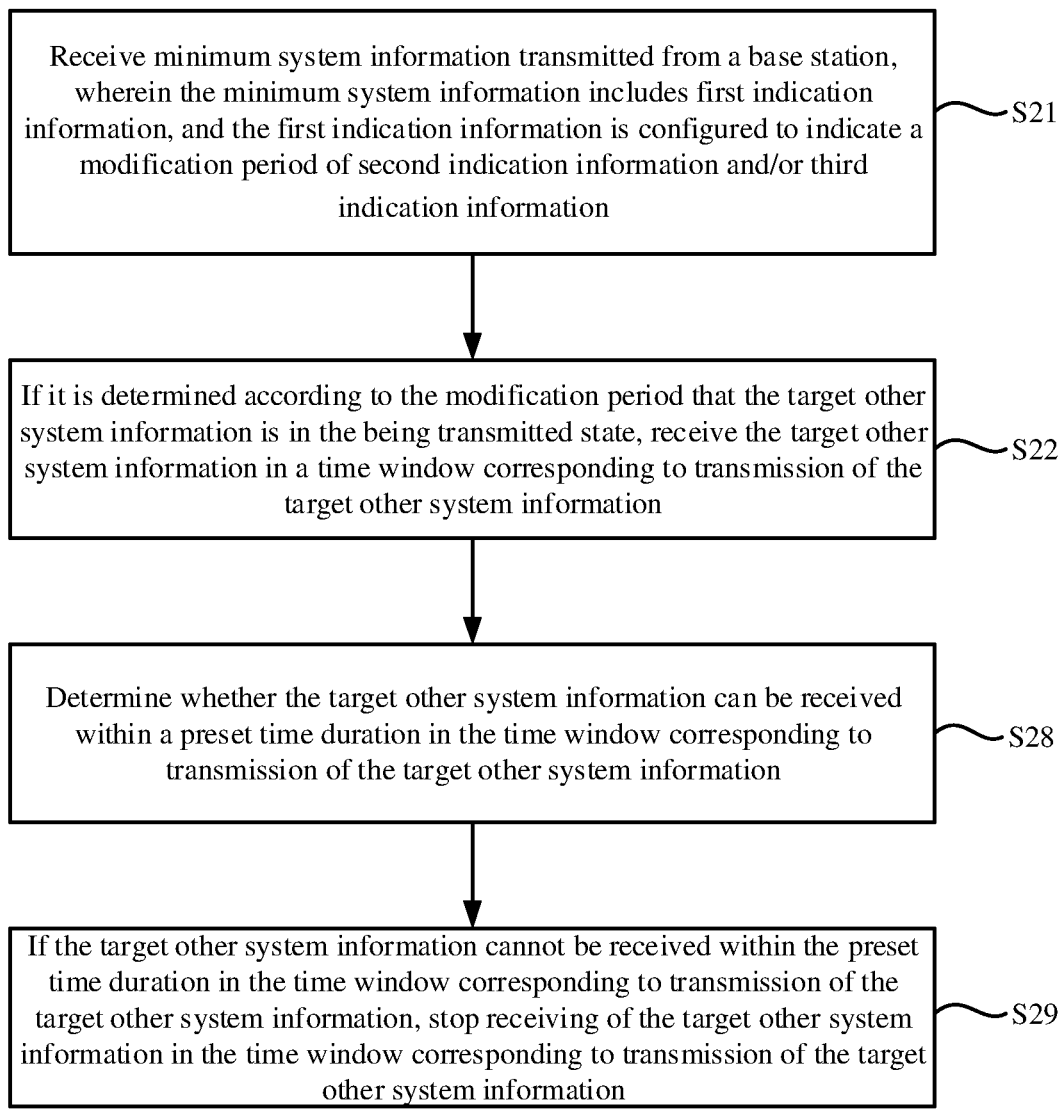
FIG. 5 is a flow chart of a system information receiving method according to an exemplary embodiment.

FIG. 5 is a flowchart of a system information receiving method according to an exemplary embodiment. As shown in FIG. 5, on the basis of the embodiment shown in FIG. 2, the foregoing system information receiving method further includes the following steps:

In step S28, whether the target other system information can be received within a preset time duration in the time window corresponding to transmission of the target other system information is determined.

In step S29, if the target other system information cannot be received within the preset time duration in the time window corresponding to transmission of the target other system information, receiving of the target other system information in the time window corresponding to transmission of the target other system information is stopped.

In an embodiment, there is a certain time interval between times when the user equipment receives minimum system information. If the second indication information in the minimum system information is changed but the user equipment has not received the changed second indication information, the user equipment will apply the receiving policy corresponding to the transmission state indicated by the second indication information before the change.

For example, if the target other system information is changed from to-be-scheduled to not-to-be-scheduled, or changed from being transmitted to not being transmitted, but the user equipment has not received corresponding indication information, the user equipment will receive the target other system information in a corresponding time window. However, because the target other system information is not to be scheduled, or not to be transmitted, the user equipment cannot receive the target other system information in the corresponding time window.

In an embodiment, the preset time duration may be several subframes, and the preset time duration may be configured by the base station, that is, the base station transmits indication information for indicating the preset time duration to the user equipment, and the user equipment determines the preset time duration according to the indication information. As another example, the preset time duration can be specified by the system, that is, the base station does not need to configure the preset time duration, and the user equipment determines the preset time duration as specified by the system.

By confirming whether the user equipment can receive the target other system information within the preset time duration in the corresponding time window, whether the scheduling state and/or the transmission state of the target other system information have been changed can be determined. For example, the preset time duration is 0.5 milliseconds, if the target other system information is not received in the first 0.5 milliseconds in the closest corresponding time window, it can be determined that the target other system information is changed from to-be-scheduled state to unscheduled state (for example, a radio network temporary identifier is not monitored in the physical downlink control channel), or the target other system information is changed from being transmitted state to not being transmitted state, so that the user equipment can stop receiving the target other system information to reduce electricity consumption.

Figure 6:
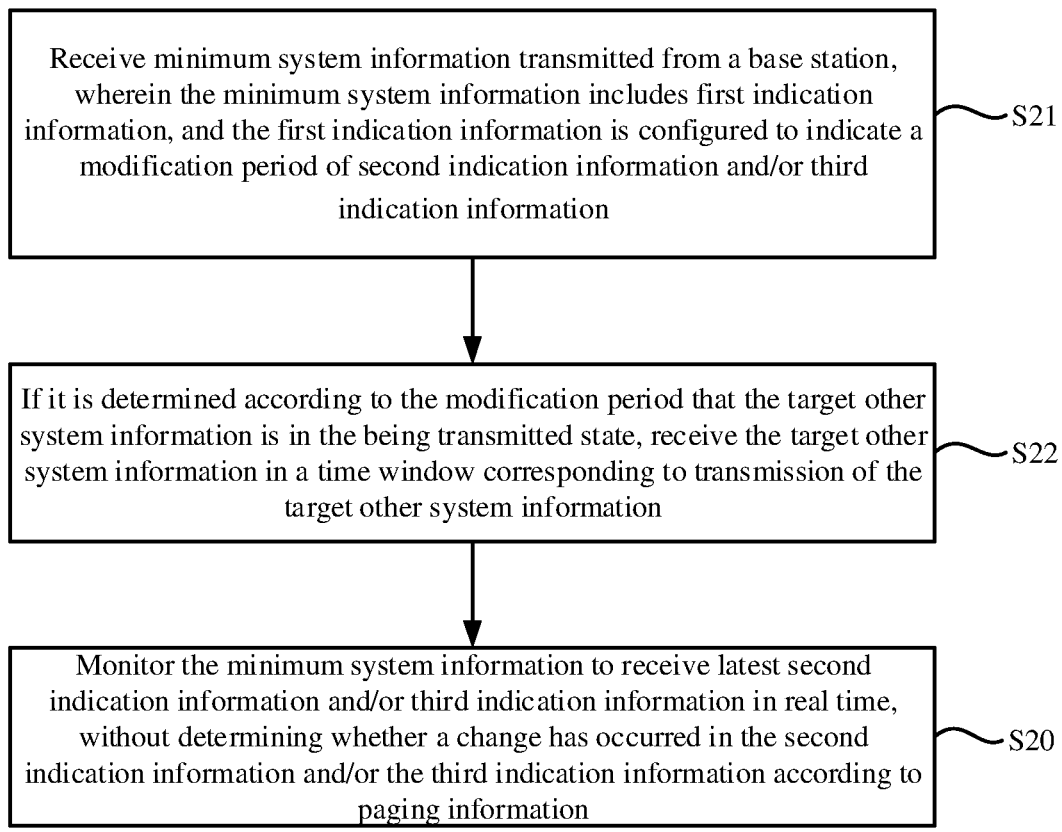
FIG. 6 is a flow chart of a system information receiving method according to an exemplary embodiment.

FIG. 6 is a flowchart of a system information receiving method according to an exemplary embodiment. As shown in FIG. 6, on the basis of the embodiment shown in FIG. 2, the foregoing system information receiving method further includes the following step.

In step S20, the minimum system information is monitored to receive latest second indication information and/or third indication information in real time, without determining whether a change has occurred in the second indication information and/or the third indication information according to paging information.

In the related arts, the change of the second indication information and/or the third indication information in the minimum system information is indicated by paging information. According to the embodiment, the latest second indication information and/or the third indication information may be monitored by the user equipment. For example, the latest second indication information is monitored, i.e., the latest second indication information is received in real time, and/or the latest third indication information is monitored, that is, the latest third indication information is received in real time. Therefore, it is not necessary to transmit paging information and receive paging information, thereby reducing the load of the system for transmitting and receiving information.

It should be noted that step S20 may be performed after step S22 as shown in FIG. 6, or the order of execution of the steps may be determined as needed, for example, step S20 may be performed before step S21.

Corresponding to the foregoing embodiments of the system information transmission method and system information receiving method, the present disclosure also provides embodiments of a system information transmission device and a system information receiving device.

Figure 7:
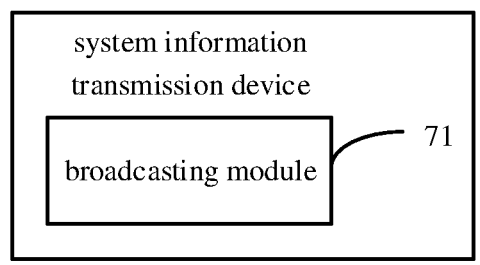
FIG. 7 is a block diagram of a system information transmission device according to an exemplary embodiment.

FIG. 7 is a block diagram of a system information transmission device according to an exemplary embodiment. As shown in FIG. 7, the system information transmission device includes a broadcasting module 71.

The broadcasting module 71 is configured to broadcast minimum system information. The minimum system information includes first indication information, and the first indication information is configured to indicate a modification period of second indication information and/or third indication information.

The second indication information is configured to indicate whether target other system information transmitted in an on-demand manner among other system information is in a being transmitted state, and the third indication information is configured to indicate a transmission manner of the target other system information.

According to an exemplary embodiment, the third indication information is configured to indicate whether the target other system information is in the being transmitted state and to indicate the transmission manner of the target other system information.

Figure 8:
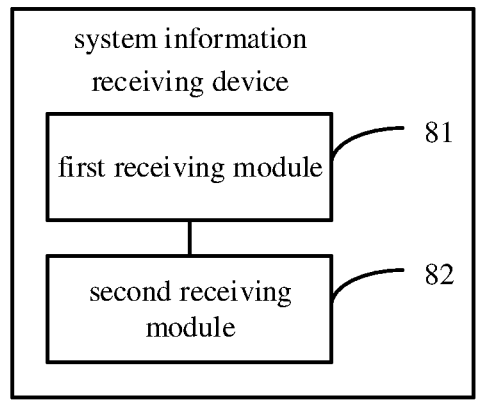
FIG. 8 is a block diagram of a system information receiving device according to an exemplary embodiment.

FIG. 8 is a block diagram of a system information receiving device according to an exemplary embodiment. As shown in FIG. 8, the system information receiving device includes a first receiving module 81 and a second receiving module 82.

The first receiving module 81 is configured to receive minimum system information transmitted from a base station. The minimum system information includes first indication information, and the first indication information is configured to indicate a modification period of second indication information and/or third indication information;

The second indication information is configured to indicate whether target other system information transmitted in an on-demand manner among other system information is in a being transmitted state, and the third indication information is configured to indicate a transmission manner of the target other system information.

The second receiving module 82 is configured to, if it is determined according to the modification period that the target other system information is in the being transmitted state, receive the target other system information in a time window corresponding to transmission of the target other system information.

Figure 9:
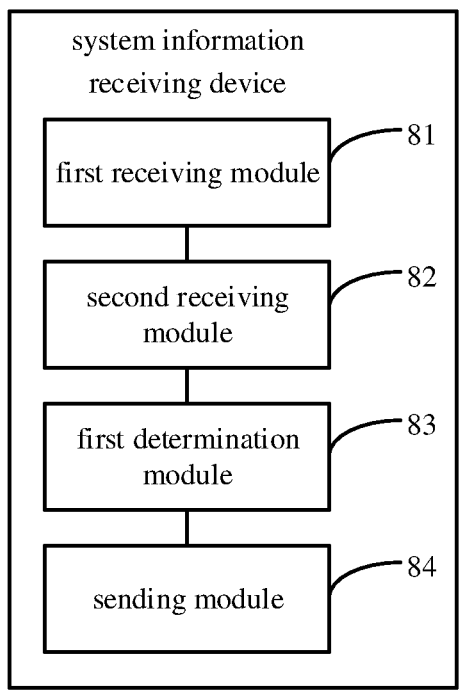
FIG. 9 is a block diagram of a system information receiving device according to an exemplary embodiment.

FIG. 9 is a block diagram of a system information receiving device according to an exemplary embodiment. As shown in FIG. 9, on the basis of the embodiments as shown in FIG. 8, the device further includes a first determination module 83 and a sending module 84.

The first determination module 83 is configured to, before a second request for acquiring first target other system information again is sent to the base station, determine whether acknowledgement information transmitted by the base station in response to a first request has been received.

The sending module 84 is configured to, if the acknowledgement information has been received, send the second request to the base station.

Figure 10:
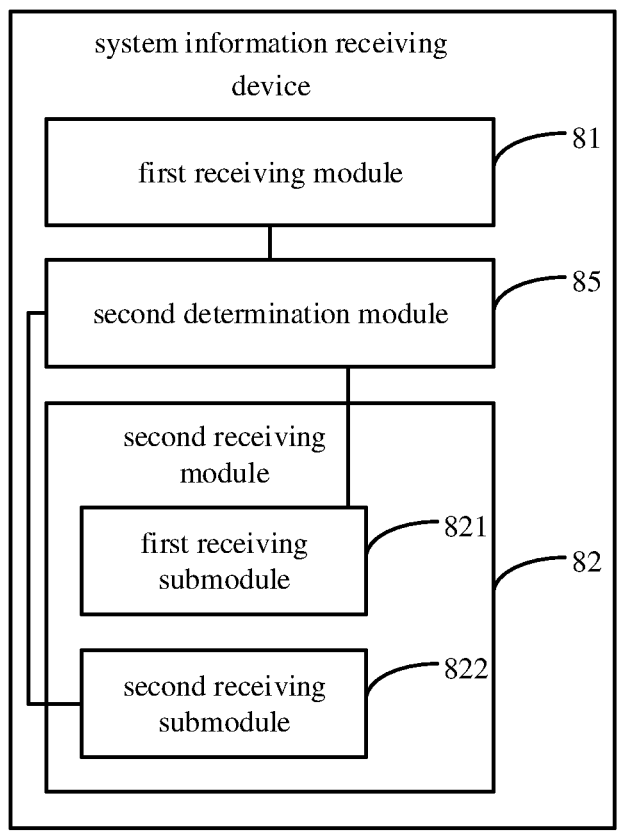
FIG. 10 is a block diagram of a system information receiving device according to an exemplary embodiment.

FIG. 10 is a block diagram of a system information receiving device according to an exemplary embodiment. As shown in FIG. 10, on the basis of the embodiments in FIG. 8, the device further includes a second determination module 85.

The second determination module 85 is configured to, after a request for acquiring the target other system information is sent to the base station and before the target other system information is received in the time window corresponding to transmission of the target other system information, determine whether the target other system information is to be transmitted in a closest time window corresponding to transmission of the target other system information according to the second indication information in latest received minimum system information.

The second receiving module 82 includes a first receiving submodule 821 and a second receiving submodule 822.

The first receiving submodule 821 is configured to, if the target other system information is to be transmitted in the closest time window corresponding to transmission of the target other system information, receive the target other system information in the time window corresponding to transmission of the target other system information.

The second receiving submodule 822 is configured to, if the target other system information is not to be transmitted in the closest time window corresponding to transmission of the target other system information, stop receiving of the target other system information in the time window corresponding to transmission of the target other system information.

Figure 11:
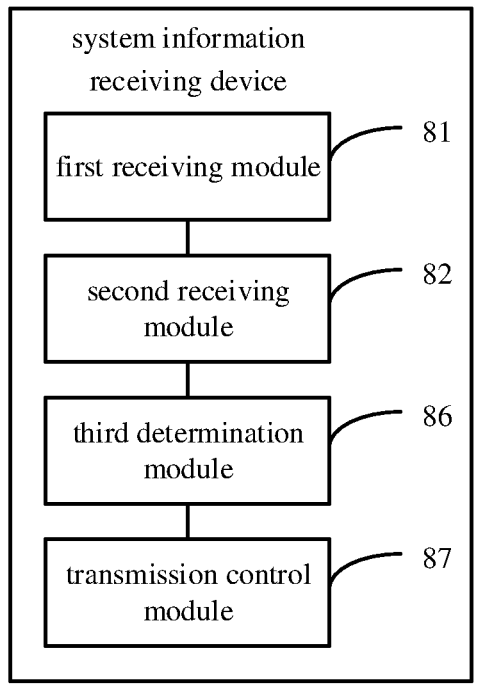
FIG. 11 is a block diagram of a system information receiving device according to an exemplary embodiment.

FIG. 11 is a block diagram of a system information receiving device according to an exemplary embodiment. As shown in FIG. 11, on the basis of the embodiments in FIG. 8, the device further includes a third determination module 86 and a transmission control module 87.

The third determination module 86 is configured to determine whether the target other system information can be received within a preset time duration in the time window corresponding to transmission of the target other system information.

The transmission control module 87 is configured to, if the target other system information cannot be received within the preset time duration in the time window corresponding to transmission of the target other system information, stop receiving of the target other system information in the time window corresponding to transmission of the target other system information.

Figure 12:
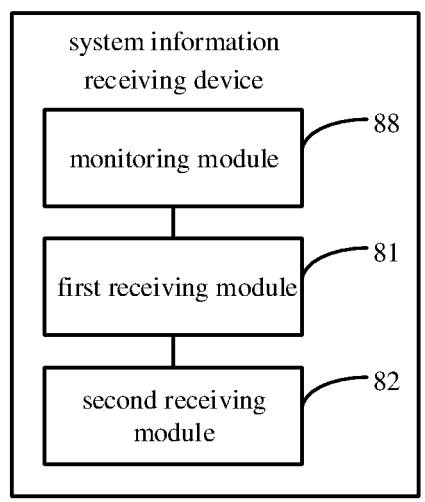
FIG. 12 is a block diagram of a system information receiving device according to an exemplary embodiment.

FIG. 12 is a block diagram of a system information receiving device according to an exemplary embodiment. As shown in FIG. 12, on the basis of the embodiment in FIG. 8, the device further includes a monitoring module 88.

The monitoring module 88 is configured to monitor the minimum system information to receive latest second indication information and/or third indication information in real time, without determining whether a change has occurred in the second indication information and/or the third indication information according to paging information.

With respect to the devices in the above embodiments, the specific manners for performing operations for individual modules therein have been described in detail in the method embodiments, which will not be elaborated herein.

For the device embodiments, since they correspond to the method embodiments, reference may be made to descriptions of the method embodiments. The device embodiments described above are merely illustrative, the modules described as separate components may or may not be physically separate, and the components shown as modules may or may not be physical modules, i.e. the modules may be located at one place, or may be distributed over multiple network modules. Those of ordinary skill in the art can understand that some or all of the modules may be selected according to actual needs to achieve the objectives of the present disclosure and can implement the embodiments without any creative effort.

The present disclosure further provides a system information transmission device, including: a processor; a memory storing instructions executable by the processor; wherein the processor is configured to: broadcast minimum system information, wherein the minimum system information includes first indication information, and the first indication information is configured to indicate a modification period of second indication information and/or third indication information; wherein the second indication information is configured to indicate whether target other system information transmitted in an on-demand manner among other system information is in a being transmitted state, and the third indication information is configured to indicate a transmission manner of the target other system information.

The present disclosure further provides a system information receiving device, including: a processor; a memory storing instructions executable by the processor; wherein the processor is configured to: receive minimum system information transmitted from a base station, wherein the minimum system information includes first indication information, and the first indication information is configured to indicate a modification period of second indication information and/or third indication information; wherein the second indication information is configured to indicate whether target other system information transmitted in an on-demand manner among other system information is in a being transmitted state, and the third indication information is configured to indicate a transmission manner of the target other system information; if it is determined according to the modification period that the target other system information is in the being transmitted state, receive the target other system information in a time window corresponding to transmission of the target other system information.

The present disclosure further provides a terminal including a memory and one or more programs. The one or more programs are stored in the memory and configured to be executed by one or more processors. The one or more programs include instructions for performing the following operation(s): broadcasting minimum system information, wherein the minimum system information includes first indication information, and the first indication information is configured to indicate a modification period of second indication information and/or third indication information; wherein the second indication information is configured to indicate whether target other system information transmitted in an on-demand manner among other system information is in a being transmitted state, and the third indication information is configured to indicate a transmission manner of the target other system information.

The present disclosure further provides a terminal including a memory and one or more programs. The one or more programs are stored in the memory and configured to be executed by one or more processors. The one or more programs include instructions for performing the following operation(s): receiving minimum system information transmitted from a base station, wherein the minimum system information includes first indication information, and the first indication information is configured to indicate a modification period of second indication information and/or third indication information; wherein the second indication information is configured to indicate whether target other system information transmitted in an on-demand manner among other system information is in a being transmitted state, and the third indication information is configured to indicate a transmission manner of the target other system information; and if it is determined according to the modification period that the target other system information is in the being transmitted state, receiving the target other system information in a time window corresponding to transmission of the target other system information.

Figure 13:
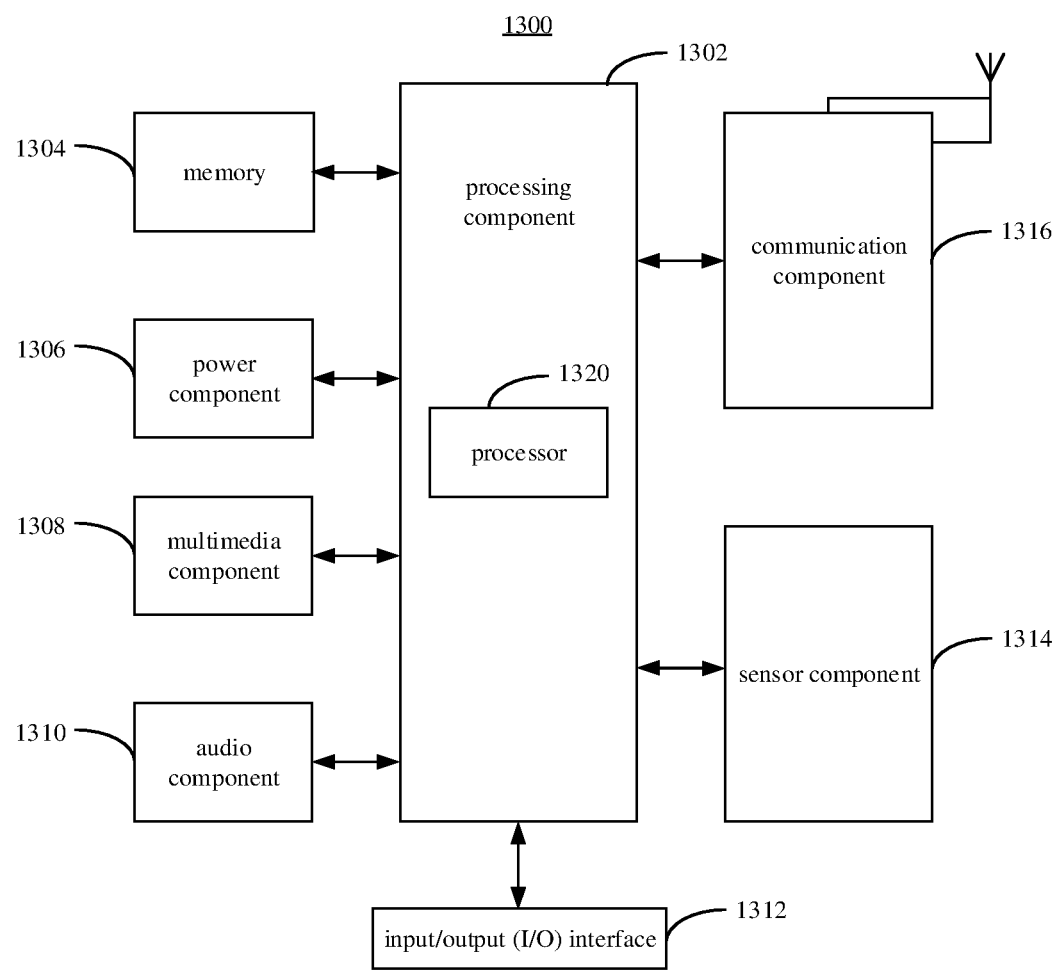
FIG. 13 is a schematic diagram of a device according to an exemplary embodiment.

FIG. 13 is a block diagram of a device 1300 according to an exemplary embodiment. For example, the device 1300 may be a mobile phone, a computer, a digital broadcast terminal, a messaging device, a gaming console, a tablet, a medical device, exercise equipment, a personal digital assistant, and the like.

Referring to FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 4G, or 5G, or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. In one exemplary embodiment, the communication component 1316 may be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1304, executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A system information transmission method, comprising:
broadcasting minimum system information, wherein the minimum system information comprises first indication information, and at least one of second indication information or third indication information,
wherein the first indication information is configured to indicate at least one of a modification period of the second indication information or a modification period of the third indication information, and a change in the second indication information or the third indication information is not indicated by transmitting paging information;
wherein the second indication information is configured to indicate whether target other system information among other system information is in a being transmitted state, and the third indication information is configured to indicate a transmission manner of the target other system information.

2. The method according to claim 1, wherein the second indication information and the third indication information share one or more bits.

3. A system information receiving method, comprising:
monitoring minimum system information, without determining whether a change has occurred in second indication information and/or third indication information according to paging information;
receiving the minimum system information transmitted from a base station, wherein the minimum system information comprises first indication information, and at least one of the second indication information or the third indication information, wherein the first indication information is configured to indicate at least one of a modification period of the second indication information or a modification period of the third indication information,
wherein the second indication information is configured to indicate whether target other system information among other system information is in a being transmitted state, and the third indication information is configured to indicate a transmission manner of the target other system information; and
if it is determined according to the modification period of the second indication information that the target other system information is in the being transmitted state, receiving the target other system information in a time window corresponding to transmission of the target other system information.

4. The method according to claim 3, wherein the target other system information is first target other system information, the method further comprising:
before sending to the base station a second request for acquiring second target other system information, determining whether acknowledgement information transmitted by the base station in response to a first request for acquiring the first target other system information has been received; and
if the acknowledgement information has been received, sending the second request to the base station.

5. The method according to claim 3, further comprising:
after sending a request for acquiring the target other system information to the base station and before receiving the target other system information in the time window corresponding to transmission of the target other system information, according to the second indication information in latest received minimum system information, determining whether the target other system information is to be transmitted in a closest time window corresponding to transmission of the target other system information;
if the target other system information is to be transmitted in the closest time window corresponding to transmission of the target other system information, receiving the target other system information in the time window corresponding to transmission of the target other system information; and
if the target other system information is not to be transmitted in the closest time window corresponding to transmission of the target other system information, stopping receiving of the target other system information in the time window corresponding to transmission of the target other system information.

6. The method according to claim 3, further comprising:
determining whether the target other system information can be received within a preset time duration in the time window corresponding to transmission of the target other system information; and if the target other system information cannot be received within the preset time duration in the time window corresponding to transmission of the target other system information, stopping receiving of the target other system information in the time window corresponding to transmission of the target other system information.

7. The method according to claim 3, wherein:
the minimum system information is monitored to receive at least one of latest second indication information or third indication information in real time.

8. An electronic device, comprising:
a processor; and
a memory storing instructions executable by the processor;
wherein the processor is configured to:
broadcast minimum system information, wherein the minimum system information comprises first indication information, and at least one of second indication information or third indication information,
wherein the first indication information is configured to indicate at least one of a modification period of the second indication information or a modification period of the third indication information, and a change in the second indication information or the third indication information is not indicated by transmitting paging information;
wherein the second indication information is configured to indicate whether target other system information among other system information is in a being transmitted state, and the third indication information is configured to indicate a transmission manner of the target other system information.

9. The electronic device according to claim 8, wherein the second indication information and the third indication information share one or more bits.

10. An electronic device, comprising:
a processor; and
a memory storing instructions executable by the processor;
wherein the processor is configured to:
monitor minimum system information, without determining whether a change has occurred in second indication information and/or third indication information according to paging information;
receive the minimum system information transmitted from a base station, wherein the minimum system information comprises first indication information, and at least one of the second indication information or the third indication information, wherein the first indication information is configured to indicate at least one of a modification period of the second indication information or a modification period of the third indication information,
wherein the second indication information is configured to indicate whether target other system information among other system information is in a being transmitted state, and the third indication information is configured to indicate a transmission manner of the target other system information; and if it is determined according to the modification period of the second indication information that the target other system information is in the being transmitted state, receive the target other system information in a time window corresponding to transmission of the target other system information.

11. The electronic device according to claim 10, wherein the target other system information is first target other system information, and the processor is further configured to:
before a second request for acquiring second target other system information is sent to the base station, determine whether acknowledgement information transmitted by the base station in response to a first request for acquiring the first target other system information has been received; and
if the acknowledgement information has been received, send the second request to the base station.

12. The electronic device according to claim 10, wherein the processor is further configured to:
after a request for acquiring the target other system information is sent to the base station and before the target other system information is received in the time window corresponding to transmission of the target other system information, according to the second indication information in latest received minimum system information, determine whether the target other system information is to be transmitted in a closest time window corresponding to transmission of the target other system information;
if the target other system information is to be transmitted in the closest time window corresponding to transmission of the target other system information, receive the target other system information in the time window corresponding to transmission of the target other system information; and
if the target other system information is not to be transmitted in the closest time window corresponding to transmission of the target other system information, stop receiving of the target other system information in the time window corresponding to transmission of the target other system information.

13. The electronic device according to claim 10, wherein the processor is further configured to:
determine whether the target other system information can be received within a preset time duration in the time window corresponding to transmission of the target other system information; and
if the target other system information cannot be received within the preset time duration in the time window corresponding to transmission of the target other system information, stop receiving of the target other system information in the time window corresponding to transmission of the target other system information.

14. The electronic device according to claim 10, wherein:
the minimum system information is monitored to receive at least one of latest second indication information or third indication information in real time.

* * * * *